United States Patent Office 2,750,408
Patented June 12, 1956

2,750,408

α,β-UNSATURATED KETONES AND THEIR PREPARATION

Felix Bergmann and Shalom Sar El, Jerusalem, Israel

No Drawing. Application August 26, 1952,
Serial No. 307,398

15 Claims. (Cl. 260—476)

This invention relates to the preparation of α,β-unsaturated ketones of the general type

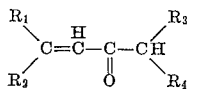

wherein $R_1$ and $R_2$ stand for the same or different alkyl, aryl, aralkyl or cycloalkyl radicals, and either, but not both in the same ketone, may be hydrogen; and $R_3$ and $R_4$ stand for the same or different aryl radicals and either, but not both, may be hydrogen.

The invention is applicable to the preparation of a very large range of unsaturated ketones, of the kind referred to, many of which could not be prepared by any known method while in other cases the invention gives a better and simpler way of preparing such compounds. The invention also concerns enol esters corresponding to the ketones aforesaid.

Known methods of preparing α,β-unsaturated ketones have involved either the condensation of an α-methylene group with a compound having a reactive carbonyl group with the elimination of water, or the abstraction of hydrogen from both the α and β carbon atoms next to the keto group. Either way entails the use of catalysts and has still other difficulties and inconveniences. Another known process of preparing unsaturated ketones consists in reacting an olefinic hydrocarbon in the vapor phase with monocarboxylic acid halides having between 2 and 6 carbon atoms. This process is not applicable to the production of the particular unsaturated ketones to which this invention relates.

The invention provides a process that proceeds smoothly and with a high yield in the liquid phase in the absence of a catalyst.

The invention consists in a process for the preparation of α,β-unsaturated ketones or their enol esters, wherein an unsaturated compound of the general formula

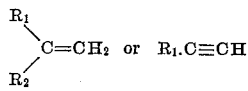

is subjected to reaction with an acyl halide of the general formula

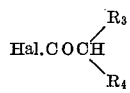

wherein $R_1$, $R_2$, $R_3$ and $R_4$ have the respective significations indicated above, and "Hal" stands for chlorine or bromine.

By the reaction a hydrogen atom bound to the unsubstituted unsaturated carbon atom of the unsaturated compound is directly replaced by the acyl radical with the evolution of hydrogen halide. In some cases the reaction will proceed at elevated temperatures of the order of up to 200° C., in other cases moderate temperatures of the order of 125° C. may suffice. The evolution of the hydrogen halide can be measured, which allows to evaluate the progress of the reaction.

The invention also consists in certain new α,β-unsaturated ketones and corresponding enol esters which will be described hereinafter and which have for the first time been prepared by the process according to the invention.

The invention is illustrated by the following examples to which it is, of course, not limited.

Example 1

In a flask provided with gas inlet and gas outlet and protected by $CaCl_2$ against the access of moisture, a mixture of 270 g. of 1:1-diphenyl ethylene and 400 g. of phenacetyl chloride is heated for 8 hours to 195–200° C. while a continuous stream of dry nitrogen is passed through the mixture. The reaction mixture is then immediately fractionated in a high vacuum and a fraction boiling under 3 mm. Hg pressure at 250° C. is collected. The distillate solidifies upon trituration with ethanol. Crystallisation from ethanol yields 200 g. of colorless prisms of M. P. 143° C. This substance is an enol ester forming presumably in accordance with the following equations:

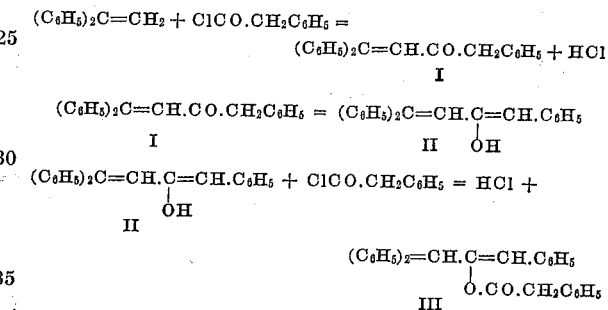

Apparently in the reaction mixture there exists an equilibrium between the β,β-diphenylvinyl-benzyl ketone (I) and the corresponding enol (II) and the latter is esterified by reaction with a further molecule of phenacetyl chloride and yields the ester (III). The enol ester (III) can finally be converted into the unsaturated ketone (I) by saponification with alcoholic KOH. It distils at 183–185° C. (under 1 mm.) and crystallizes spontaneously with M. P. 44° C. Both the ketone (I) and enol ester (II) are new substances.

In the fractionated distillation mentioned above, a second product can be isolated from a higher boiling fraction (B. P. 275° C. under 3 mm.) This is a yellow syrup which crystallizes upon trituration with methanol and yields a colorless substance of M. P. 135–136° C. identifiable as 1:4-diphenyl naphthalene. The ratio between the yields of enol ester and this latter substance can be controlled within wide limits by variation of the conditions of the reaction. By keeping the temperature as low as possible and passing a rapid stream of nitrogen through the reaction mixture, the enol ester can be made the main product. At higher temperatures and with a weak flow of nitrogen, or no nitrogen at all, that is, if HCl is allowed to accumulate in the reaction mixture, the 1:4-diphenyl naphthalene can be made to prevail.

Example 2

104 g. of styrene and 154 g. of phenacetyl chloride in 150 cc. of benzene are refluxed first for 20 hours at 105–110° C., then for 30 hours at 115° C., and then for 15 hours at 125–128° C. From time to time the loss in solvent due to the passing current of nitrogen is made up. Upon cooling a crystalline substance precipitates. When re-crystallized from butyl acetate it melts at 138° C. This is the phenacetyl ester of the enol corresponding to benzyl-styryl ketone.

The filtrate from the crystalline precipitate aforesaid is poured on ice, the benzene layer separated and washed with alkali carbonate solution. After drying over sodium sulfate, the mixture is fractionated in a high vacuum, to give a portion of B. P. 150–160° C. (8 mm.). Upon refractionation, this oil distills at 110° C. (4 mm.) and crystalizes spontaneously, M. P. 70–71° C. This product is benzyl-styryl ketone.

Example 3

A mixture of 120 g. of α-methylstyrene, 210 g. of phenacetyl chloride and 250 cc. of dry toluene is refluxed 130–135° C. for 20 hours in a stream of nitrogen. The amount of HCl liberated from the reaction mixture during this time is about 80% of the theoretical amount calculated for a reaction in which 2 moles of phenacetyl chloride participate. The reaction mixture is then fractionated in vacuo (about 3 mm.) whereby a yellow oil of B. P. 150–170° C. (3 mm.) is obtained as a main fraction. Upon trituration with ethanol the oil crystallizes. Recrystallized from ethanol, the substance forms glistering scales, M. P. 104° C. The yield is 18 g. This new substance is an enol ester of the formula

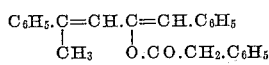

This ester can be saponified, e. g. by refluxing it with 1.2 equivalents of 0.1-N ethanolic KOH for 20 minutes. By distilling the alcohol off, preferably in vacuo, extracting the residue with ether and distilling the ether off, one obtains a yellow oil, B. P. 145° C. (4 mm.) which is the expected β-phenyl-β-methylvinyl-benzyl ketone.

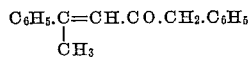

It forms a dinitrophenyl hydrazone which can be obtained from ethanol as orange-red needles of M. P. 123° C.

Example 4

A mixture of 80 g. of phenylacetylene and 80 g. of phenacetyl chloride is heated to 140° C. for 11 hours. Upon fractionation a portion of B. P. 150–160° C. (5 mm.) is obtained, which crystallizes upon trituration with petroleum ether. From ethanol, colorless needles of M. P. 64–65° C. are obtained in a yield of 45 g. This is an enol ester of the probable formula

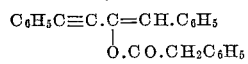

Example 5

A mixture of 60 g. of allylbenzene and 80 g. of phenacetyl chloride is heated to 170–180° C. for 4 hours, when about 95% of the theoretical amount of HCl has escaped. Direct fractionation yields, inter alia, 65 g. of a yellow oil of B. P. 155–165° C. (3 mm.), with $n_D^{20}=1.5817$. This is the phenacetyl ester of the enol corresponding to the expected ketone

The latter can be obtained by saponification of the enol ester with ethanolic KOH and is an oil which forms a 2:4-dinitrophenyl hydrazone, crystallizing from ethanol in red prisms of M. P. 78° C.

Example 6

A mixture of 212 g. of ethyl ω-undecylenate and 185 g. of phenacetyl chloride is heated in a stream of dry nitrogen to 130–140° C. for 15 hours. The excess of phenacetyl chloride is then destroyed by addition of ethanol, and the mixture is fractionated under reduced pressure. The fraction boiling at 160°–180° C. (3 mm.) is collected; it amount to about 150 g. This is the expected ketone of the formula

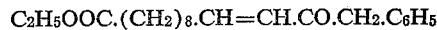

We claim:

1. The process wherein an unsaturated compound of the group consisting of compounds of the general formulae

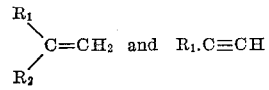

is condensed at elevated temperature in the liquid phase in the absence of catalysts and with elimination of HCl, with an acyl halide of the general formula

wherein $R_1$ and $R_2$ stand each for a radical selected from the group consisting of aryl and aralkyl radicals and one of them may be hydrogen; $R_3$ stands for an aryl radical, and Hal stands for a halogen atom of the group consisting of chlorine and bromine.

2. A process according to claim 1, wherein the said unsaturated compound is condensed with the acyl halide in a proportion of at least two molecular parts of the latter for each molecular part of the former, to form an enol ester of the group consisting of compounds of the general formulae

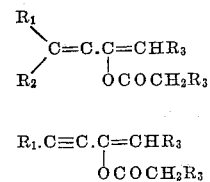

and wherein $R_1$, $R_2$ and $R_3$ have the same meaning as in claim 1.

3. A process according to claim 2, wherein the said enol ester is saponified to form a free ketone of the group consisting of compounds of the general formulae

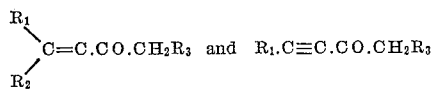

wherein $R_1$, $R_2$ and $R_3$ have the same meaning as in claim 1.

4. A process according to claim 1, wherein 1:1-diphenyl ethylene is condensed with phenacetyl chloride.

5. A process according to claim 4, wherein 1:1-diphenyl ethylene is condensed with phenacetyl chloride in a proportion of at least two molecular parts of the latter for each molecular part of the former, to form the phenacetyl ester of the enol corresponding to β,β-diphenylvinyl-benzyl ketone.

6. A process according to claim 5, wherein the enol ester obtained is saponified to form the free β,β-diphenyl-vinyl-benzyl ketone.

7. A process according to claim 1, wherein styrene is condensed with phenacetyl chloride.

8. A process according to claim 7 which comprises condensing styrene with phenacetyl chloride in a proportion of at least two molecular parts of the latter for each molecular part of the former; obtaining a reaction mixture containing benzyl-styryl ketone and the phenacetyl ester of the corresponding enol; precipitating from the mixture the said ester and separating the precipitate from the remaining liquid; and separating from the latter the said ketone.

9. A process according to claim 1, wherein α-methyl-styrene is condensed with phenacetyl chloride.

10. A process according to claim 9, wherein α-methyl-styrene is condensed with phenacetyl chloride in a proportion of at least two molecular parts of the latter for each molecular part of the former to form the phenacetyl ester of the enol corresponding to β-phenyl-β-methyl-vinyl-benzyl ketone.

11. A process according to claim 10, wherein the enol ester is saponified to form the free ketone.

12. A process according to claim 1, wherein phenylacetylene is condensed with phenacetyl chloride in a proportion of at least two molecular parts of the latter for each molecular part of the former to form an enol ester of the probable formula $$C_6H_5.C{\equiv}C.C{=}CH.C_6H_5$$
$$|$$
$$O.CO.CH_2.C_6H_5$$

13. A process according to claim 1, wherein allylbenzene is condensed in the liquid phase with phenacetyl chloride.

14. A process according to claim 13, wherein allylbenzene is condensed in the liquid phase with phenacetyl chloride in a proportion of at least two molecular parts of the latter for each molecular part of the former to form the phenacetyl ester of the enol corresponding to the ketone $C_6H_5.CH_2.CH_2{=}CH.CO.CH_2.C_6H_5$.

15. A process according to claim 14, wherein said enol ester is saponified to form the free ketone.

References Cited in the file of this patent
UNITED STATES PATENTS

| | | |
|---|---|---|
| 1,737,203 | Shoeller et al. | Nov. 26, 1929 |
| 2,006,198 | Frolich | June 25, 1935 |
| 2,125,393 | Nelles et al. | Aug. 2, 1938 |